United States Patent [19]

Duggins et al.

[11] 4,024,716

[45] May 24, 1977

[54] IRRIGATION TUBING COUPLING FASTENER

[75] Inventors: Ray Brown Duggins, Chadds Ford, Pa.; Peter Garrett Mackauf, San Diego, Calif.; David Little Withington, Phoenix, Ariz.

[73] Assignee: E. I. DuPont de Nemours and Company, Wilmington, Del.

[22] Filed: Sept. 16, 1976

[21] Appl. No.: 723,960

Related U.S. Application Data

[63] Continuation-in-part of Ser. No. 554,565, March 3, 1975, abandoned.

[52] U.S. Cl. .................................... 61/13; 285/5; 285/255
[51] Int. Cl.² .................... E02B 13/00; F16L 33/18
[58] Field of Search ............... 285/5, 255, 242, 6, 285/260, 13, 14, 423, 421; 61/12, 13; 239/145; 210/65

[56] References Cited

UNITED STATES PATENTS

| | | | |
|---|---|---|---|
| 1,064,154 | 6/1913 | Miller | 285/255 |
| 2,771,320 | 11/1956 | Korwin | 61/12 X |
| 2,807,505 | 9/1957 | Weitzel | 61/12 X |
| 3,167,331 | 1/1965 | Marshall | 285/255 X |
| 3,436,104 | 4/1969 | Jackson et al. | 285/242 |
| 3,560,028 | 2/1971 | Ohba | 285/255 |
| 3,830,067 | 8/1974 | Osborn et al. | 61/12 |

FOREIGN PATENTS OR APPLICATIONS

| | | | |
|---|---|---|---|
| 1,535,688 | 7/1968 | France | 285/255 |

*Primary Examiner*—Thomas F. Callaghan

[57] ABSTRACT

A fastener for joining a connecting tube and an expansible tube telescoped on the end of the connecting tube. The fastener comprises a compressible ring on the end of the connecting tube and a tubular sheath telescoped on the connecting tube, the expansible tube and the ring. The sheath has an inner surface tapered to a circumference less than the normal circumference of the ring.

5 Claims, 3 Drawing Figures

IRRIGATION TUBING COUPLING FASTENER

CROSS-REFERNCE TO RELATED APPLICATION

This appliction is a continuation-in-paart of Application Ser. No. 554,565 filed Mar. 3, 1975 and now abandoned.

BACKGROUND OF THE INVENTION

1. Field of the Invention

This invention relates to expansible porous irrigation tubes and means of making leakproof connections with and between such tubes. More specifically, the invention relates to a fastener for joining a connecting tube to an expansible porous tube.

2. Description of the Prior Art

A method for irrigating by means of burying expansible porous tubes (hereinafter expansible tubes) has been developed and is known as drip irrigation. Each expansible tube is constructed of two parallel lengths of porous material bound together along the edges. The term "porous material" includes any material through which a liquid may pass. During use expansible tubes may be joined together or to a water pipe via a connecting tube, by inserting the end of the connecting tube into the end of the expansible tube. A problem arises in attempting to seal the expansible tube to the connecting tube because where each expansible tube is bound together along the edges, there are seams which cause discontinuities on the inner surface of the expansible tube. Leakage occurs along these seams.

Prior art apparatus has been used to seal expansible tubes to semi-rigid tubes by the use of compression fittings, using moving parts and threaded portions. The problem of leakage along the seams of the above-mentioned expansible tubes, however, has not been considered. What is needed is a fastener which prevents leakage along these seams and is of simple construction.

SUMMARY OF THE INVENTION

The present invention provides such a fastener for joining a connecting tube and an expansible tube telescoped on the end of the connecting tube. The fastener is composed of a compressible ring on the end of the connecting tube and a tubular sheath (hereinafter sheath) telescoped on the connecting tube, the expansible tube and the ring. The sheath has an inner surface tapered to a circumference less than the normal circumference of the ring.

DESCRIPTION OF THE PREFERRED EMBODIMENT

Figure 1:
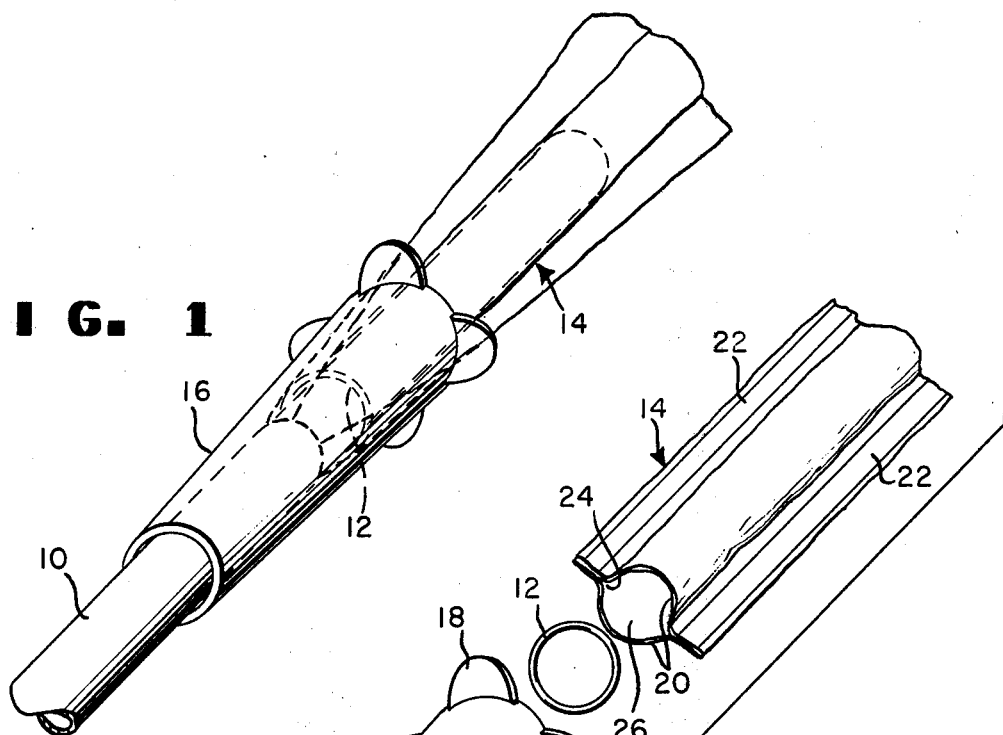
FIG. 1 is perspective view of an expansible tube joined by a fastener to a connecting tube.

A fastener for joining a connecting tube and an expansible irrigation tube is shown in FIG. 1. Connecting tube 10 has an O-ring 12 slipped over one end. Telescoped over the end of connecting tube 10 and O-ring 12 is an expansible tube 14. A sheath 16 made up of a rigid tubular cone with a tapered inner surface is telescoped over connecting tube 10, O-ring 12, and expansible tube 14 to compress these latter elements together.

Figure 2:
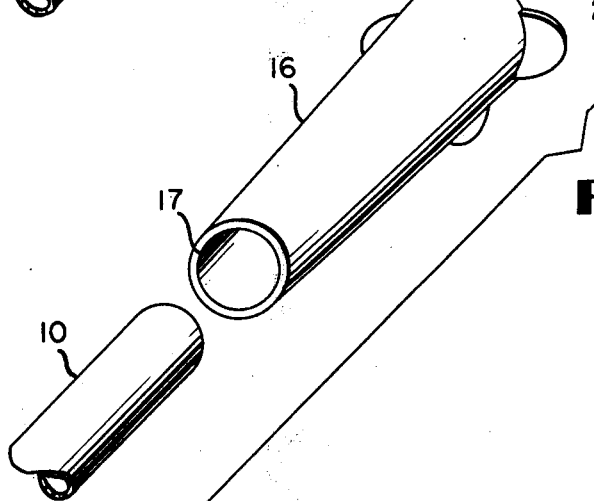
FIG. 2 is an exploded view of the expansible tube, connecting tube, and fastener of FIG. 1.

FIG. 2 shows an exploded view of connecting tube 10, O-ring 12, expansible tube 14, and sheath 16. Connecting tube 10 is a plastic semi-rigid tube which has an outer diameter of a size which will pass through an opening 17 in one end of sheath 16. On the outside of sheath 16 are protruding ears 18. Expansible tube 14 is constructed of two parallel lengths of porous polyethylene paper 20 which are bound together at the edges by heavy beads of polyethylene polymer 22. A surface discontinuity 24 is present on the inner surface of expansible tube 14 along each bound edge. An opening 26 in expansible tube 14 is large enough to slip over O-ring and connector tube 10. O-ring 12 is a standard O-ring which, for example, may be made of compressible plastic or rubber material. Its size is critical and chosen such that expansible tube 14 will fit over it and such that it will seal expansible tube 14 to connecting tube 10 at a portion of sheath 16 to be described subsequently. The inside diameter of O-ring 12 should be small enough to fit snugly around connecting tube 10 while the outside diameter should be as large as possible while still slipping easily into expansible tube 14.

Figure 3:
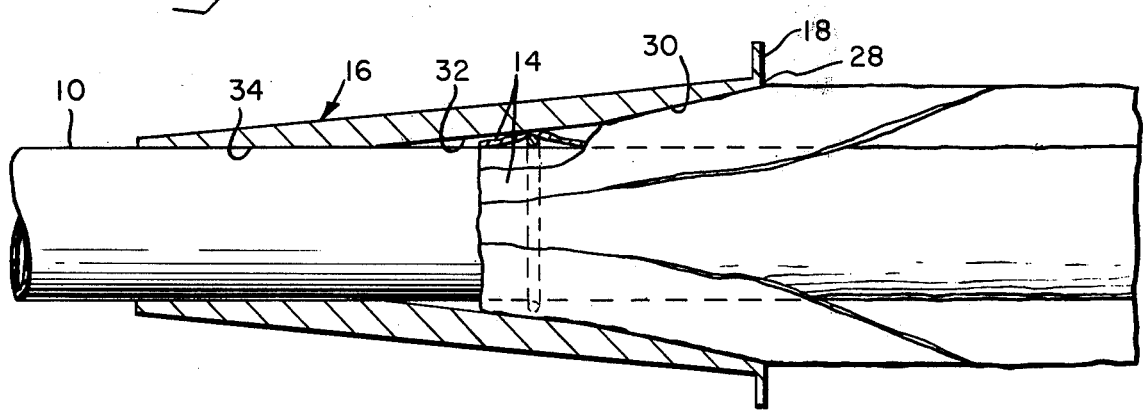
FIG. 3 is a side view, parts having been broken away and shown in section to reveal details of construction.

FIG. 3 shows a side view, partially broken away and in cross-section, of connecting tube 10, O-ring 12, expansible tube 14, and sheath 16 (with protruding ears 18). Connecting tube 10 may be of any size; however, for exemplary purposes, it is three-eights inch OD. Sheath 16 has an inner surface which is tapered in three steps. The wide end of sheath 16 has an opening 28 large enough to accommodate both connecting tube 10 and expansible tube 14. A 4° tapered section 30 begins at opening 28 and extends for one-half inch. The mid-portion of the taper is a 2° tapered section 32 which begins at the end of the 4° taper and extends for one-half inch. The last portion of the taper is actually a flat section 34, having no angular displacement; it forms a cylindrical opening five-eights inch long parallel to the surface of connecting tube 10, with the opening just large enough to accommodate connecting tube 10. Expansible tube 14 extends over O-ring 12 and is sealed against the 2° tapered section 32.

In operation a number of expansible tubes 14 are buried for irrigation purposes. The tubes may be joined to a water pipe or two such tubes may be spliced via connecting tube 10. As can be seen from the drawing connecting tube 10 has a uniform external diameter. The latter connecting tube 10 is prepared for such connections by slipping sheath 16, open end 17 first, several inches over the end of connecting tube 10. O-ring 12 is then slide on after sheath 16 about 2 inches from the end. Expansible tube 14 is telescoped over the end of connecting tube 10 and O-ring 12 about 1 inch beyond O-ring 12. Sheath 16 is then pushed with a twisting motion over expansible tube 14, O-ring 12 and connecting tube 10. The protruding ears 18 on sheath 16 allow for easy grasping under field conditons which may be wet. As sheath 16 is pushed on, expansible tube 14 enters opening 28 which is designed to allow expansible tube 14 to easily enter. The 4° tapered section 30 then passes over O-ring 12 and guides it into 2° tapered section 32. In the latter 2° tapered section 32, expansible tube 14, O-ring 12 and connecting tube 10 compress together. O-ring 12 is deformable and plugs the leaks along the two surface discontinuties 24 at the edges of expansible tube 14, thus creating a watertight seal. The taper of 2° is important since O-ring 12 may not be seated perfectly straight but may be at an angle to connecting tube 10 and a gentle taper of about 2° or less is needed to form a good seal. The taper cannot be substantially less than 2° or the sheath will have to be unsuitably long to make the entry passage to the 2° tapered section 32 large enough to allow O-ring 12 to enter and still taper to a small enough diameter such that a seal is formed.

If the diameter of connecting tube 10 is less than the manufacturing specifications, for example, less than three-eights inch OD (i.e., one-sixteenth inch tolerance), the expansible tube 14 and O-ring 12 may slip through 2° tapered section 32. Flat section 34 will receive expansible tube 14 and O-ring 12 and act as a safety region through which these latter elements may not easily be pulled. Therefore, they will not leave sheath 16.

What is claimed is:

1. A joint comprising a semi-rigid connecting tube of uniform external diameter, a compressible O-ring engaging the external surface of said connecting tube, a porous tube telescoped over one end of said connecting tube and covering said O-ring, and a tubular sheath telescoped over said porous tube, said tubular sheath engaging said porous tube and causing compression of the O-ring between said porous tube and said connecting tube, which tubular sheath has an inner surface tapered to a circumference just large enough to accommodate said connecting tube.

2. The joint of claim 1 wherein the portions of the tubular sheath engaging the porous tube and causing compression of is tapered about 2°.

3. The joint of claim 2 wherein the porous tube is formed of two parallel lengths of porous material bound together along the edges.

4. The joint of claim 3 wherein the larger end of the inner surface of said tubular sheath is tapered about 4°.

5. The joint of claim 4 wherein the small end of the inner surface of said tubular sheath is parallel to said connecting tube.

* * * * *